United States Patent
Dagnino et al.

(10) Patent No.: US 10,860,013 B2
(45) Date of Patent: Dec. 8, 2020

(54) POWER SYSTEM EQUIPMENT DESIGN FLAW IDENTIFICATION

(71) Applicant: ABB Power Grids Switzerland AG, Baden (CH)

(72) Inventors: Aldo Dagnino, Cary, NC (US); Luiz V. Cheim, St. Charles, MO (US); Lan Lin, Raleigh, NC (US); Poorvi Patel, Ballwin, MO (US); Asim Fazlagic, Fuquay Varina, NC (US)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 14/886,597

(22) Filed: Oct. 19, 2015

(65) Prior Publication Data

US 2016/0041552 A1 Feb. 11, 2016

Related U.S. Application Data

(63) Continuation-in-part of application No. 14/083,616, filed on Nov. 19, 2013.

(60) Provisional application No. 61/727,875, filed on Nov. 19, 2012.

(51) Int. Cl.
G05B 23/02 (2006.01)
G01M 99/00 (2011.01)

(52) U.S. Cl.
CPC ......... *G05B 23/0272* (2013.01); *G01M 99/00* (2013.01); *G05B 23/0283* (2013.01)

(58) Field of Classification Search
CPC .................................................. G01M 99/00
USPC ........................................................ 702/183
See application file for complete search history.

(56) References Cited

U.S. PATENT DOCUMENTS

| 7,653,512 B2 | 1/2010 | Cheung et al. |
| 8,170,893 B1 | 5/2012 | Rossi |
| 8,209,839 B1 * | 7/2012 | Brostmeyer ............ F01D 5/005 29/407.05 |

(Continued)

FOREIGN PATENT DOCUMENTS

| CN | 101273314 A | 9/2008 |
| CN | 102193555 A | 9/2011 |

OTHER PUBLICATIONS

Int. Search Report/Written Opinion cited in PCT Application No. PCT/US2013/070695 dated Feb. 17, 2014, 17 pgs.

(Continued)

*Primary Examiner* — Ricky Ngon
(74) *Attorney, Agent, or Firm* — Sage Patent Group

(57) ABSTRACT

Among other things, one or more techniques and/or systems are provided for providing recommendations to address design flaws of power system equipment and/or model design flaws for equipment model types of power system equipment. For example, historical sensor data and/or historical field test data, collected from power system equipment, may be analyzed to identify a design flaw of the power system equipment (e.g., a design flaw of a seal ring). A redesign cost to redesign the power system equipment, a failure impact of a failure from the design flaw, a maintenance repair and/or replacement cost, a manufacture alternative component cost to use an alternative component for manufacturing the power system equipment, and/or other factors may be taken into account to crate and provide a recommendation to address the design flaw.

18 Claims, 7 Drawing Sheets

(56) References Cited

U.S. PATENT DOCUMENTS

| | | | |
|---|---|---|---|
| 8,437,904 B2 | 5/2013 | Mansouri et al. | |
| 8,762,106 B2* | 6/2014 | Miller | G05B 17/02 702/179 |
| 8,768,657 B2* | 7/2014 | Goldfine | G01N 27/82 702/183 |
| 2003/0229664 A1* | 12/2003 | Hollaway | G05B 19/4184 709/201 |
| 2006/0241907 A1 | 10/2006 | Armstrong et al. | |
| 2007/0093925 A1* | 4/2007 | Moughler | G05B 19/41865 700/108 |
| 2008/0109185 A1 | 5/2008 | Cheung et al. | |
| 2011/0054806 A1* | 3/2011 | Goldfine | G07C 3/00 702/34 |
| 2011/0213744 A1 | 9/2011 | Sparling et al. | |
| 2012/0197852 A1 | 8/2012 | Dutta et al. | |
| 2012/0259585 A1 | 10/2012 | Haynes et al. | |

OTHER PUBLICATIONS

"A Predictive Maintenance Approach for Power Distribution Systems", S. Khan, K.L. Butler and B. Don Russell, Oct. 3, 1995, Proceeding of the 27th Annual North American Power Symposium, Bozeman, MT, reprinted from the Internet at: http://psalserver.tamu.edu/main/papers/211%20Khan%20Butler%20Russell.pdf, pp. 700-707.

"IAEA-TECDOC-1551 Implementation Strategies and Tools for Condition Based Maintenance at Nuclear Power Plants", May 2007, reprinted from the Internet at: http://www-pub.iaea.org/MTCD/publications/PDF/te_1551_web.pdf, 188 pgs.

"Novel Methods for the Condition Based Maintenance of Distribution Networks", Edmund Handschin, Ingo Jurgens, Jens Weller and Markus Zdrallek, Jul. 1, 2007, Power Tech, 2008, IEEE Lausanne IEEE, Piscataway, NJ. 6 pgs.

"Data Fusion for Developing Predictive Diagnostics for Electromechanical Systems", Carl S. Byington and Amulya K. Garga, Jan. 1, 2001, reprinted from the Internet at: http://dsp-book.narod.ru/HMDF/2379ch23.pdf, 32 pgs.

"Hidden semi-Markov model-based methodology for multi-sensor equipment health diagnosis and prognosis", Ming Dong and David He, Nov. 21, 2008, European Journal of Operational Research, Amsterdam, NL, vol. 178, No. 3, 22 pgs.

"Sensor Fusion and Complex Data Analysis for Predictive Maintenance", Dr. Rahmat Shoureshi, Tim Norick, David Linder, John Work and Paula Kaptain, Jan. 1, 2003, Proceeding of the 36th Annual Hawaii International Conference on System Sciences 2003, 8 pgs.

"Fault diagnosis of power transformer based on multi-layer SVM classifier", Ganyun Lv, Haozhong Cheng, Haibao Zhai and Lixin Dong, Jul. 2005, Electric Power Systems Research, vol. 74, Issue 2, Abstract only, 2 pgs.

"Condition Data Aggregation with Application to Failure Rate Calculation of Power Transformers", Jyotishman Pathak, Yong Jiang, Vasant Honavar and James McCalley, 2006, Proceedings of the 39th Hawaii International Conference on System Sciences, cited from the Internet at: http://www.computer.org/csdl/proceedings/hicss/2006/2507/10/250710024a.pdf, 10 pgs.

"Optimal Parameters of Rectifier Power Transformer by Intelligent Techniques", K.S. Rama Rao, Knn. Md Hasan and M.N. Karsisi, 2009, The Online Journal on Electronics and Electrical Engineering, vol. 1, No. 1, cited on the Internet at: http://www.computer.org/csdl/proceedings/hicss/2006/2507100241a.pdf, pp. 15-19.

"Association Rule Mining-Based Dissolved Gas Analysis for Fault Diagnosis of Power Transformers", Z. Yang, W.H. Tang, A. Shintemirov and Q.H. Wu, Jul. 14, 2009, IEEE Transactions on Systems, Man and Cybermetics, Part C, Application and Reviews, Abstract only, 2 pgs.

"Rough Set Theory for Data Mining for Fault Diagnosis on Power Transformers", Zhao Wenqing Zhao and Tongli Zhu, 2006, IEEE TENCON, 2006 Region 10 Conference, Abstract only, 2 pgs.

"On-line Transformer Condition Monitoring through Diagnosis and Anomaly Detection", V.M. Catterson, S.E. Rudd, S.D.J. McArthur and G. Moss, Nov. 2009, In 15th International Conference on Intelligent Systems Application to Power Systems, Abstract only, 2 pgs.

"Data Mining Techniques to Assess the Condition of High Voltage Electrical Plant", A.J. McGrail, E Gulski, E.R.S. Groot, D. Allan, D. Birthwhistle and T.R. Blackburn, 2002, In Set of Papers Presented to the CIGRE 2002 Session, No. 39, Aug. 25-30, 2002, Paris, France, 12 pgs.

"Advances in Data Mining for Dissolved Gas Analysis", D.G.Esp and A.J. McGrail, Apr. 2000, Conference Record of the 2000 IEEE International Symposium on electrical Insulation, Abstract only, 2 pgs.

"Data Mining for Distribution System Fault Classification", H.M. Dola and B.H. Chowohury, 2005, In Proceedings of 37th Annual North American Power symposium, Abstract only, 2 pgs.

"A Transformer Condition Assessment Framework Based on Data Mining", Yongli Zhu, Lizeng Wu, Xueyu Li and Jinsha Yuan, 2005, IEEE Power Engineering Society General Meeting, Abstract only, 2 pgs.

Biologically Inspired Intelligent Fault Diagnosis for Power Distribution Systems, Le Xu, 2006, Ph.D. Dissertation, North Carolina State University, Abstract only, 2 pgs.

"Artificial Intelligence Applications in the Diagnosis of Power Transfer Incipient Faults", Zhenyuan Wang, 2000, Ph.D. Dissertation, Virginia Tech, 10 pgs.

Reply Final Office Action cited in U.S. Appl. No. 14/083,616 dated Apr. 20, 2017, 18 pgs.

Non-Final Office Action cited in U.S. Appl. No. 14/083,616 dated Jun. 2, 2016, 16 pgs.

Reply Non-Final Office Action cited in U.S. Appl. No. 14/083,616 dated Aug. 31, 2016, 13 pgs.

Final Office Action cited in U.S. Appl. No. 14/083,616 dated Dec. 20, 2016, 18 pgs.

First Chinese Office Action cited in Chinese Application No. 201380070756.7 dated Dec. 27, 2016, 13 pgs.

EP Office Action cited in EP Application No. 13802782.6 dated Oct. 11, 2016, 10 pgs.

* cited by examiner

POWER SYSTEM EQUIPMENT DESIGN FLAW IDENTIFICATION

CROSS-REFERENCE TO RELATED APPLICATIONS

This application is a Continuation-In-Part of and claims benefit to U.S. patent application Ser. No. 14/083,616, filed on Nov. 19, 2013 and titled "ASSESSMENT OF POWER SYSTEM EQUIPMENT FOR EQUIPMENT MAINTENANCE AND/OR RISK MITIGATION," which is a Non-Provisional of U.S. Provisional Patent Application No. 61/727,875, filed on Nov. 19, 2012 and titled "ASSESSMENT OF POWER SYSTEM EQUIPMENT FOR EQUIPMENT MAINTENANCE AND/OR RISK MITIGATION," which are both incorporated herein by reference.

BACKGROUND

The present application relates to the field of power systems and more particularly to systems and/or techniques for identifying and providing recommendations for design flaws and/or model design flaw of power system equipment.

A power system comprises a network of power system equipment configured to supply, transmit, and/or use electrical power. For example, a power grid comprises generators, transmission systems, and/or distribution systems. Generators, or power stations, are configured to produce electricity from combustible fuels (e.g., coal, natural gas, etc.) and/or non-combustible fuels (e.g., wind, solar, nuclear, etc.). Transmission systems are configured to carry or transmit the electricity from the generators to loads, such as end users. Distribution systems are configured to feed the supplied electricity to nearby homes, commercial businesses, and/or other establishments. Some electrical components or equipment of a power system include transformers and circuit breakers, for example. Transmission systems and/or distribution systems, for example, generally comprise one or more transformers configured to convert or transform electricity at one voltage (e.g. a voltage used to transmit electricity) to electricity at another voltage (e.g., a voltage desired by a load receiving the electricity). Circuit breakers may be utilized to mitigate damage to other electrical components by limiting current flow to such other components, for example. Unfortunately, power system equipment may be costly to maintain, repair, and/or replace.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to one aspect, a method for providing a recommendation to address a design flaw of power system equipment is provided. The method comprises acquiring historical sensor data yielded from one or more sensors operably coupled to power system equipment. The historical sensor data is indicative of one or more sensor measurements. Historical field test data, yielded from one or more field tests performed on the power system equipment, is acquired. The historical field test data is indicative of one or more field test measurements. The historical sensor data and/or the historical field test data are analyzed to identify a design flaw of the power system equipment. A recommendation for addressing the design flaw is provided.

According to another aspect, a system for providing a recommendation to address a design flaw of power system equipment is provided. The system comprises a historian data repository configured to acquire historical sensor data yielded from one or more sensors operably coupled to power system equipment. The historical sensor data is indicative of one or more sensor measurements. The historian data repository is configured to acquire historical field test data yielded from one or more field tests performed on the power system equipment. The historical field test data is indicative of one or more field test measurements. The system comprises a data analyzer component configured to analyze the sensor data and/or the historical field test data to identify a design flaw of the power system equipment. The data analyzer component is configured to provide a recommendation for addressing the design flaw.

According to yet another aspect, a computer readable medium comprising processor executable instructions that when executed perform a method for providing a recommendation associated with a model design flaw for an equipment model type of power system equipment is provided. The method comprises acquiring a set of historical sensor data for a set of power system equipment corresponding to an equipment model type. A set of historical field test data, for the set of power system equipment, is acquired. The set of historical sensor data and/or the set of historical field test data is analyzed to identify a model design flaw for the equipment model type. A recommendation, of at least one of a maintenance strategy for the set of power system equipment to address the model design flaw or a manufacturing redesign to implement during manufacturing of power system equipment having the equipment model type, may be recommended.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
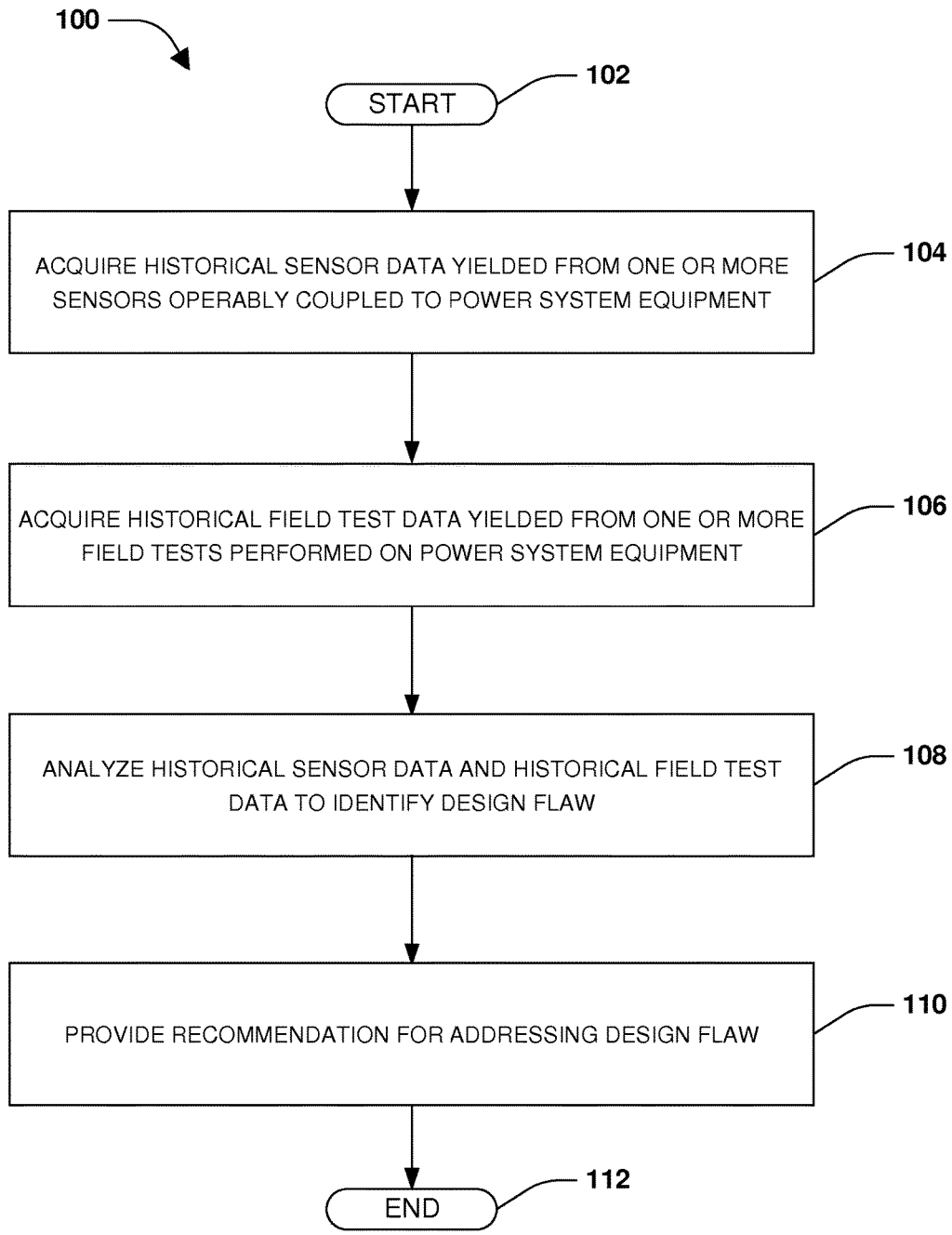
FIG. 1 is a flow diagram illustrating an exemplary method of providing a recommendation to address a design flaw of power system equipment.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A power grid may be comprised of various power system equipment, such as thousands or millions of electrical components. The failure of some of these electrical components may reduce the performance of the power grid. Moreover, due to, among other things, the cost and/or size of some electrical components, there may be little to no redundancy at some junctions in the power grid. A failure at one of more of these junctions may result in the loss of electricity to some consumers. As such, the detection of power system equipment on the verge of failure and/or the detection of power system equipment in need of maintenance may be an important component of maintaining the overall performance of the power grid.

Accordingly, sensors may be placed within power system equipment to capture information about the performance of the power system equipment. For example, some high voltage transformers comprise sensors configured to measure an oil temperature, to gauge an amount of water in the oil, to measure dissolved gases in the oil, and/or to measure a temperature of the core. Data yielded from such sensors may be referred to herein as sensor data and is typically transmitted (e.g., via a fiber optics network or other communication medium) to a central repository, where it is analyzed to provide a snap-shot of the present-day health of the power system.

Moreover, as part of regular maintenance, field tests may be performed on the power system equipment. For example, transformers may be de-energized to perform tests that cannot be performed via sensors and/or to perform tests that can provide a more detailed understanding of the power system equipment (e.g., relative to the sensor measurements). For example, a sensor may measure up to six types of dissolved gases in the oil of a transformer whereas a field test may measure thirteen or more types of dissolved gases. As such, the field test data derived from the field test may provide a more detailed snap-shot of the present-day health of the power system than the sensor data derived from the sensors.

While such sensor data and field test data may be used to provide a snap-shot of the present-day health or performance of the power system, little to no information, regarding the identification and recommendation for how to address design flaws of power system equipment, has been derived from such data. Accordingly, one or more systems and/or techniques for providing a recommendation to address a design flaw of power system equipment and/or for providing a recommendation associated with a model design flaw for an equipment model type of power system equipment are provided. A recommendation may be based upon a redesign cost to redesign a component within the power system equipment having the design flaw, a failure impact of a failure due to the design flaw, a maintenance replacement cost for the component, a maintenance repair cost for the component, a manufacturing alterative component cost of a second component to use in the place of the component, a cost to modify a different component to compensate for the design flaw of the component (e.g., improved insulation that can resist increased temperatures of the component due to the design flaw), etc.

An embodiment of providing a recommendation to address a design flaw of power system equipment is illustrated by an exemplary method 100 of FIG. 1. At 102, the method 100 starts. At 104, historical sensor data, yielded from one or more sensors operably coupled to power system equipment (e.g., a transformer, a circuit breaker, a capacitor, a generator, a voltage regulator, etc.), may be acquired. The historical sensor data may be indicative of one or more sensor measurements. The historical sensor data may be data that has accumulated from the sensors over a specified time interval and may be indicative of sensor measurements (or results of sensor measurements) taken over the specified time interval. For example, the historical sensor data is indicative of sensor measurements taken over a first time interval, which may be a few days, 6 months, a year, the life of the sensor(s) taking the measurements, the life of the power system equipment, etc.

Acquiring the historical sensor data may comprise, among other things, retrieving the historical sensor data from a central repository (e.g., a historian data repository) and/or transferring the historical sensor data from a storage medium to a medium where computations can be performed on the sensor data. For example, the historical sensor data may be copied from a central repository (e.g., such as a magnetic data storage device) to random-access memory on a computing device configured to perform computations on the sensor data. In another embodiment, acquiring the historical sensor data may comprise being granted access to the historical sensor data. For example, authentication credentials or other identity verification tools (e.g., IP address verification, MAC address verification, etc.) may be utilized to verify that an entity attempting to access the historical sensor data has permission to access the data. After the identity is verified, the entity may gain access to the historical sensor data and thus acquire the historical sensor data.

The type(s) of sensor data collected may be a function of, among other things, a type of power system equipment (e.g., an equipment model type) and/or measurement functions of sensors operably coupled to the power system equipment. For example, the power system equipment may comprise a power transformer. In such an embodiment, the sensors may be configured to measure oil temperature, an amount/percentage of water in the oil, a temperature of the core, concentrations of one or more dissolved gases in the oil, and/or an ambient air temperature surrounding the power transformer. As such, the sensory data may relate to the oil temperature, water-to-oil ratio, core temperature, dissolved gas concentrations, and/or ambient air temperature, for example. In an example where the power system equipment comprises a circuit breaker, capacitor, voltage regulator, or other component of a power system, the sensor data that is collected may be indicative of other or different information.

At 106, historical field test data, yielded from one or more field tests performed on the power system equipment, may be acquired. The historical field test data may be indicative of one or more field test measurements. The historical field test data may be data that has been accumulated from field test(s) on the power system equipment over a specified time interval and may be indicative of field test measurements (or results of the field test measurements) taken over the specified time interval. For example, the historical field test data is indicative of field test measurements taken over a second time interval. The second time interval may correspond to (e.g., match) the first time interval over which sensor measurements are taken, may have some overlap with the first time interval, or may be non-overlapping with the first time interval.

It may be appreciated that as used herein, field tests are intended to refer to tests performed on-site at the power system equipment (e.g., typically while the power system is de-energized) and/or tests performed from samples collected from the power system equipment. Generally, such tests require human interaction with the power system equipment (e.g., to collect the samples), although the samples may be collected and/or the tests may be performed with little to no human interaction (e.g., via robotics or other automation techniques). Conversely, sensor measurements are typically acquired from sensors comprised within and/or operably coupled to the power system equipment. As such, sensor measurements are typically acquired with little to no human interaction. Moreover, where human interaction is desired, such interaction may occur remotely relative to the power system equipment. For example, a human operator may transmit a signal instructing one or more sensors operably coupled to the power system equipment to capture a measurement.

Historical field test data may be acquired in a manner similar to the historical sensor data or may be acquired in a different manner. For example, in one embodiment, the historical field test data may be copied from a central repository (e.g., such as a magnetic data storage device) to random-access memory on a computing device configured to perform computations on the historical field test data. In another embodiment, acquiring the historical field test data may comprise being granted access the historical field test data. For example, authentication credentials or other identity verification tools may be utilized to verify that an entity attempting to access the historical field test data has permission to access the data.

The type of field test data collected may be a function of, among other things, a type of power system equipment (e.g., an equipment model type). In an example, during field testing of a power transformer, a technician may visit the site of the power transformer and capture a sample of the oil in the transformer. Numerous tests may be performed on this oil sample to yield field test data corresponding to the power transformer. For example, dissolved gas analysis may be performed on the oil to measure carbon monoxide, carbon dioxide, acetylene, ethylene, methane, ethane, or other gas concentrations in the oil and field test data may be generated indicative of the results of the analysis. In an example where the power system equipment comprises a circuit breaker, a capacitor, a voltage regulator, or other equipment, the field tests that are performed may be different than the field tests performed for a power transformer.

At 108, the historical sensor data and/or the historical field test data may be analyzed to identify a design flaw of the power system equipment. In one embodiment, the design flaw can be identified via analytic and/or interactive techniques that use, as inputs, the historical sensor data and/or historical field test data. As an example, an algorithm, such as a machine learning and/or data analysis algorithm, may be developed based upon the historical sensor data and/or historical field test data. Such an algorithm may be configured to analyze the historical sensor data and/or historical field test data using clustering analysis, classification analysis, association analysis, pattern discovery, regression, anomaly detection analysis, and/or other predictive modeling techniques that identify trends and/or patterns in the historical sensor data and/or historical field test data. Information regarding the performance or health of the power system equipment over some period in the future may be extrapolated from this analysis, for example.

By way of example, in a power transformer elevated levels of carbon monoxide and/or carbon dioxide in the oil may indicate that the power transformer is overloaded and/or elevated levels of hydrogen in the oil may indicate the development of corona in the power transformer. Therefore, by analyzing historical field test data and/or historical sensor data yielded from the transformer over period of time, it may be estimated how long the power transformer may operate (e.g., given loading conditions of the power transformer during the period in which the historical sensor data and/or historical field test data were generated) before failing and/or requiring maintenance. In an example, a design flaw, causing the overload and/or elevated levels of hydrogen, in the power transformer may be identified.

In an example, the historical sensor data and/or the historical field test data may be evaluated to identify a health trend for the power system equipment (e.g., an increasing temperature trend that is increasing at a particular rate). The health trend may correspond to a predicted future failure and/or an urgency time metric for addressing the predicted future failure. The health trend may be indicative of a design flaw causing the increasing temperature.

At 110, a recommendation for addressing the design flaw may be provided. In an example, the recommendation may be based upon an evaluation of a redesign cost to redesign a component, of the power system equipment, having the design flaw (e.g., a seal ring component may be identified as failing due to a type of material used to make the seal ring component, a shape or size of the seal ring, etc., and thus the redesign cost may be a cost associated with using a different material and/or retooling a manufacturing assembly to change the shape or size of seal ring components during manufacture). In another example, the recommendation may be based upon an evaluation of a maintenance replacement cost to replace the component during maintenance (e.g., a cost to replace the seal ring component with a different seal ring component during maintenance). In another example, the recommendation may be based upon an evaluation of a manufacturing alternative component cost to use a second component in place of the component during manufacturing of the power system equipment (e.g., a cost to use a different type of seal ring component during manufacture of power system equipment having the seal ring component). In another example, the recommendation may be based upon an evaluation of a failure impact corresponding to a failure of the power system equipment due to the component failing from the design flaw (e.g., a cost associated with repair and/or replacement of the power system equipment in the event of a failure; a likelihood and/or duration of a power outage due to a failure; etc.). In another example, the health trend may be evaluated to create the recommendation. In this way, various factors may be considered when creating the recommendation.

In an example, a design cost to redesign the component may be determined (e.g., material costs, assembly line retooling costs, and/or other information may be available for analysis). A failure impact corresponding to an impact upon the power system equipment due to the component failing from the design flaw may be determined (e.g., a cost to replace or repair the power system equipment; a likelihood and/or duration of a power outage due to a failure; etc.). Responsive to the failure impact exceeding the redesign cost, a recommendation to redesign the power component may be provided. Responsive to the redesign cost exceeding the failure impact, a maintenance recommendation (e.g., repair and/or maintenance may be more cost effective than redesigning the seal ring) and/or a redesign of a second component of the power system equipment (e.g., failure of the seal ring may merely result in increased temperatures of the power system equipment, and thus a redesign of an insulation component may be recommended if a cost to redesign the insulation component to withstand the increased temperatures is less than a cost to redesign the seal ring) may be recommended.

In an example, the recommendation may comprise a recommended replacement component for replacing the component (e.g., a different seal ring). In another example, the recommendation may comprise a new manufacturing design for the power system equipment to implement during manufacture of the power system equipment (e.g., a new material to use for the seal ring, a new method to install the seal ring, etc.). In another example, the recommendation may comprise a maintenance strategy. The maintenance strategy may forecast a timeline for expected maintenance to the power system and/or may provide an indication of when the power system is expected to fail given operational characteristics of the power system equipment during the interval represented by the historical sensor data and/or historical field data, such as based upon the design flaw. In this way, maintenance technicians and/or a maintenance scheduler can determine whether maintenance and/or replacement of a transformer is urgent and/or determine how much longer the transformer can be in operation before requiring maintenance and/or replacement of the seal ring to address the design flaw, for example.

In an example, the power system equipment may correspond to an equipment model type, such as a particular type of transformer. A set of historical sensor data may be acquired for a set of power system equipment corresponding to the equipment model type. A set of historical field test data for the set of power system equipment may be acquired. In this way, historical sensor data and/or historical field test data may be obtained from various transformers within a power grid to determine whether those transformers also have seal rings with the design flaw. The set of historical sensor data and/or the set of historical field test data may be analyzed to identify a model design flaw for the equipment model type (e.g., a threshold percentage of seal rings within the transformers may exhibit the same characteristics, such as health trends, indicative of the design flaw). In an example, a manufacturing redesign, to implement during manufacturing of power system equipment having the equipment model type, may be recommended (e.g., where a cost to redesign during manufacturing is less than a failure impact and/or maintenance/repair cost). In another example, a maintenance strategy for the set of power system equipment may be recommended to address the model design flaw (e.g., where a cost of maintenance is less than the cost to redesign during manufacturing). The maintenance strategy may comprise a component replacement strategy and/or a repair strategy. At 112, the method 100 ends.

Figure 2:
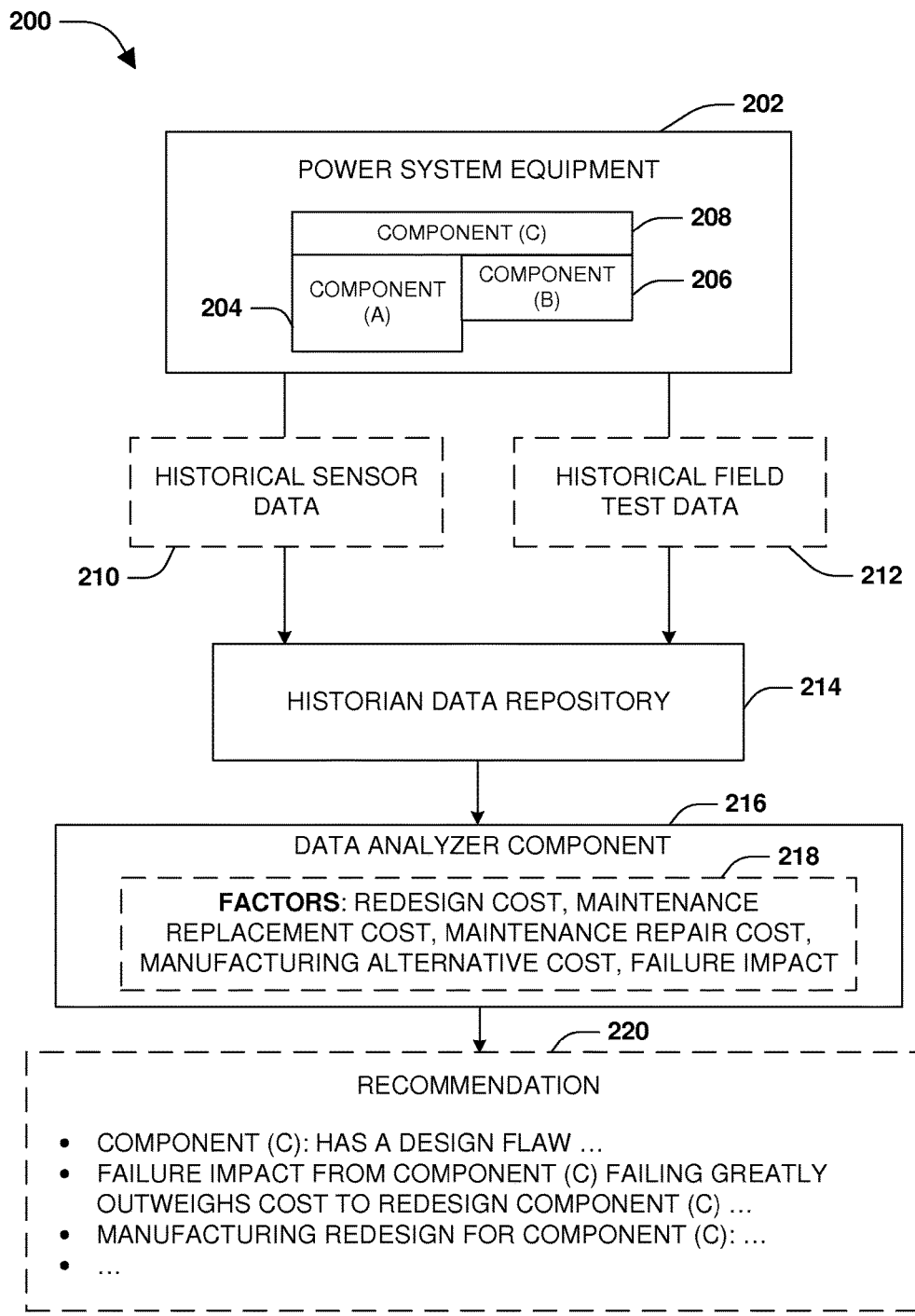
FIG. 2 illustrates a component block diagram of an example system for providing a recommendation, specifying a manufacturing redesign, to address a design flaw of power system equipment.

FIG. 2 illustrates an example of a system 200, comprising a historian data repository 214 and/or a data analyzer component 216, for providing a recommendation 220 to address a design flaw of power system equipment 202. For example, the power system equipment 202 may comprise a component (A) 204, a component (B) 206, and a component (C) 208 (e.g., components of a transformer, such as windings, a tank, a valve, bushings, a cooler, a tap-changer, a tank, insulation, a relay, etc.). The historian data repository 214 may be configured to acquire historical sensor data 210 and/or historical field test data 212 for the power system equipment 202 (e.g., temperature data, pressure data, an alert of a measurement exceeding a warning threshold, field test observations, etc.).

The data analyzer component 216 may analyze the historical sensor data 210 and/or the historical field test data 212 utilizing one or more factors 218, such as a redesign cost, a maintenance replacement cost, a maintenance repair cost, a manufacturing alternative cost, a failure impact, etc. to identify a design flaw and/or provide the recommendation 220 for addressing the design flaw. For example, the data analyzer component 216 may determine that the component (C) 208 has a design flaw (e.g., the tank may have a weak welding point where leaks may occur). The data analyzer component 216 may determine that a failure impact from component (C) 208 failing greatly weighs a cost to redesign component (C) 208 (e.g., a new welding procedure during manufacturing of tanks may be less costly than transformers failing from tanks leaking due to the design flaw). Accordingly, the data analyzer component 216 may specify, a manufacturing redesign for the component (C) 208, through the recommendation 220.

Figure 3:
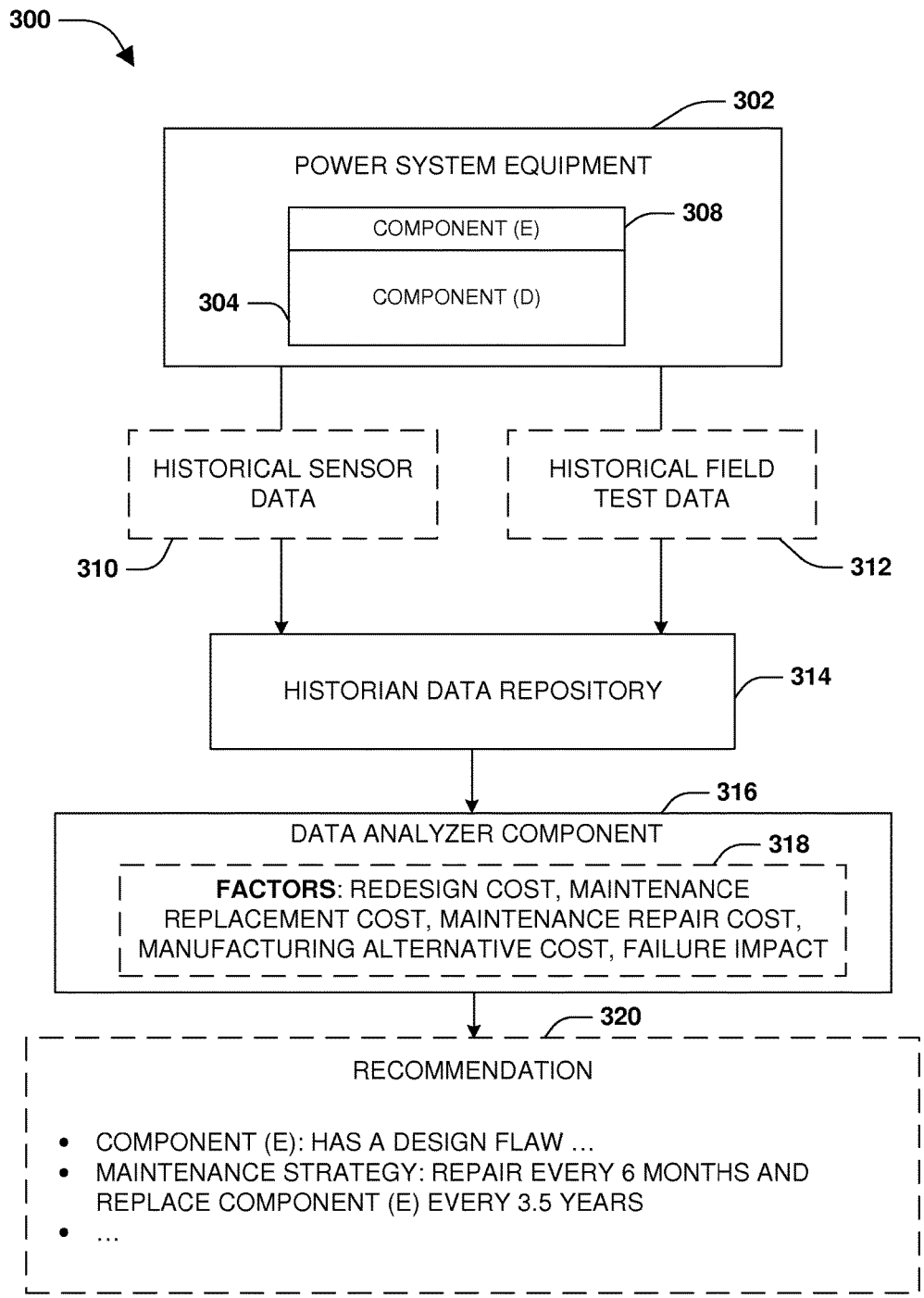
FIG. 3 illustrates a component block diagram of an example system for providing a recommendation, specifying a maintenance strategy, to address a design flaw of power system equipment.

FIG. 3 illustrates an example of a system 300, comprising a historian data repository 314 and/or a data analyzer component 316, for providing a recommendation 320 to address a design flaw of power system equipment 302. For example, the power system equipment 302 may comprise a component (D) 304 and a component (E) 308 (e.g., components of a circuit breaker). The historian data repository 314 may be configured to acquire historical sensor data 310 and/or historical field test data 312 for the power system equipment 302 (e.g., temperature data, fault data, an alert of a measurement exceeding a warning threshold, field test observations, etc.).

The data analyzer component 316 may analyze the historical sensor data 310 and/or the historical field test data 312 utilizing one or more factors 318, such as a redesign cost, a maintenance replacement cost, a maintenance repair cost, a manufacturing alternative cost, a failure impact, etc. to identify a design flaw and/or provide the recommendation 320 for addressing the design flaw. For example, the data analyzer component 316 may determine that the component (E) 308 has a design flaw. The data analyzer component 316 may determine that a failure impact from component (E) 308 failing due to the design flaw (e.g., and/or a cost to repair and/or replace the component (E) 308) is less than a cost to redesign component (E) 308. Accordingly, the data analyzer component 316 may specify, a maintenance strategy to repair the component (E) 308 every 6 months and replace the component (E) 308 every 3.5 years, through the recommendation 320.

Figure 4:
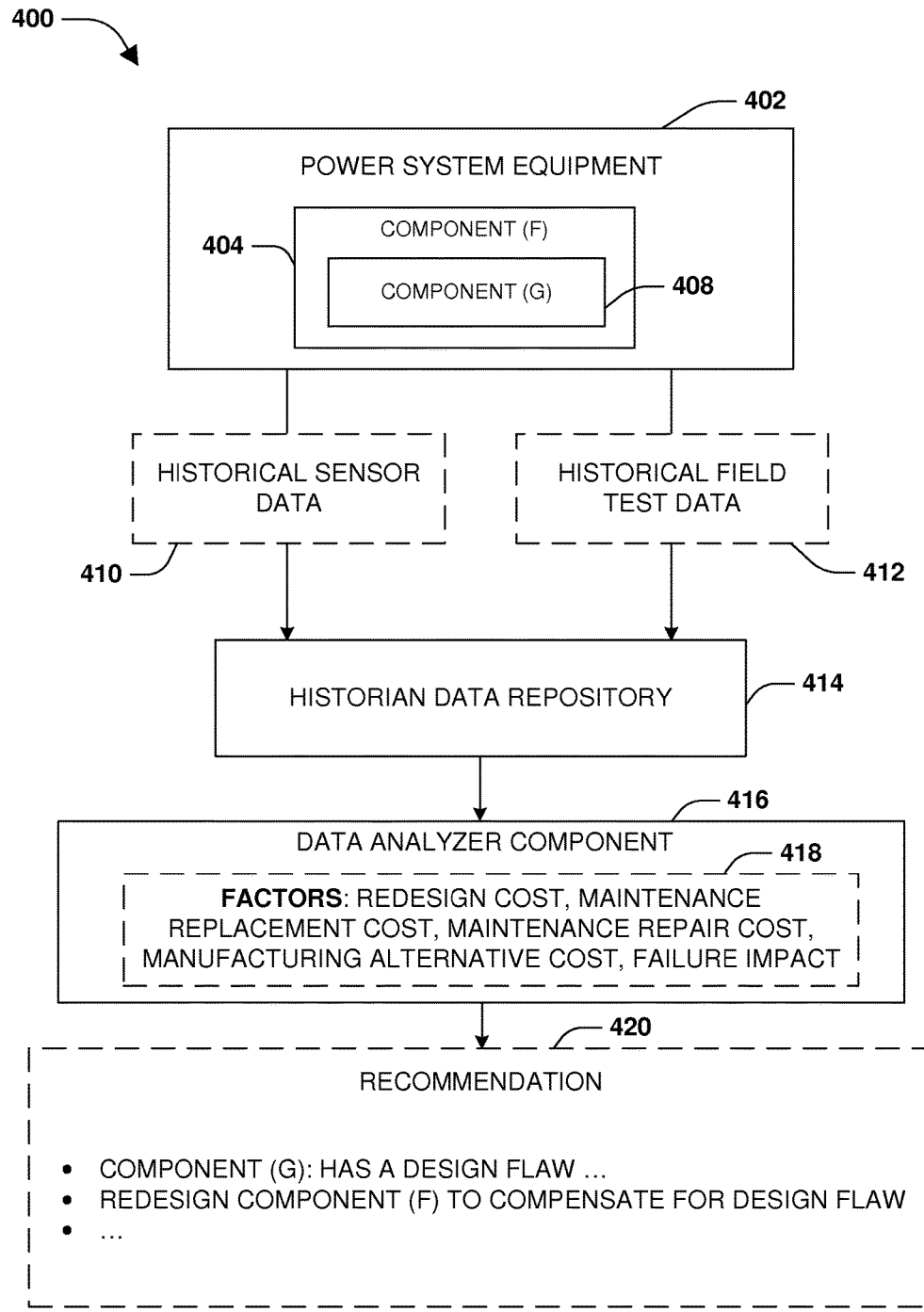
FIG. 4 illustrates a component block diagram of an example system for providing a recommendation, specifying a redesign for a second component, to address a design flaw for a first component of power system equipment.

FIG. 4 illustrates an example of a system 400, comprising a historian data repository 414 and/or a data analyzer component 416, for providing a recommendation 420 to address a design flaw of power system equipment 402. For example, the power system equipment 402 may comprise a component (F) 404 and a component (G) 408. The historian data repository 414 may be configured to acquire historical sensor data 410 and/or historical field test data 412 for the power system equipment 402 (e.g., temperature data, fault data, flow rate, moisture data, oil composition data, an alert of a measurement exceeding a warning threshold, field test observations, etc.).

The data analyzer component 416 may analyze the historical sensor data 410 and/or the historical field test data 412 utilizing one or more factors 418, such as a redesign cost, a maintenance replacement cost, a maintenance repair cost, a manufacturing alternative cost, a failure impact, etc. to identify a design flaw and/or provide the recommendation 420 for addressing the design flaw. For example, the data analyzer component 416 may determine that the component (G) 408 has a design flaw. The data analyzer component 416 may determine that a cost to redesign component (G) 408 exceeds a cost to redesign component (F) 404 to compensate for the design flaw (e.g., the design flaw of component (G) 408 may result in a temperature increase, and thus component (F) 404 may be redesign, in a cost effective manner, to withstand the temperature increase). Accordingly, the data analyzer component 416 may specify, a redesign for the component (F) 404 to compensate for the design flaw of component (G) 408, through the recommendation 420.

Figure 5:
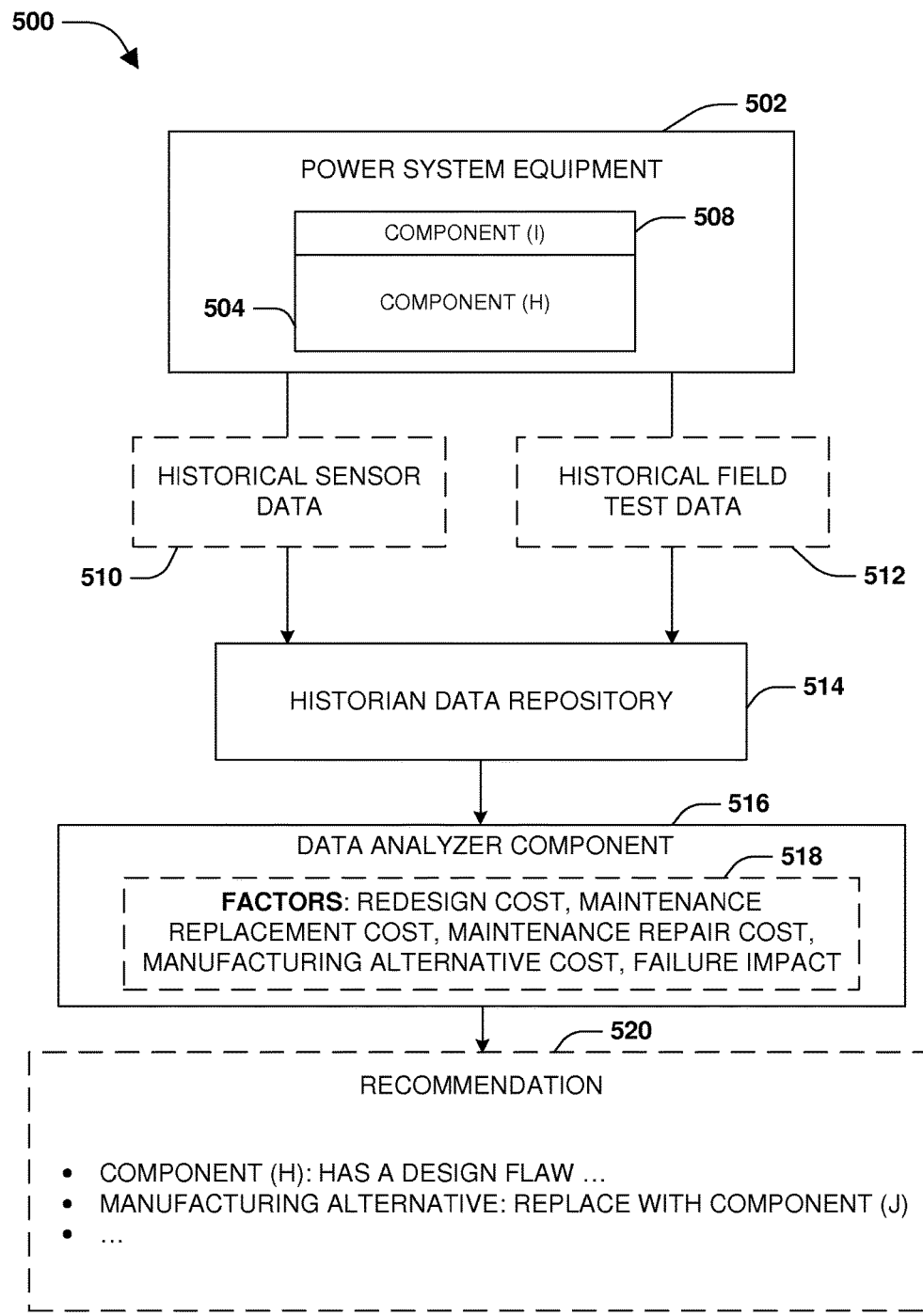
FIG. 5 illustrates a component block diagram of an example system for providing a recommendation, specifying a manufacturing alternative component used to replace a component during manufacture, to address a design flaw of power system equipment.
Figure 6:
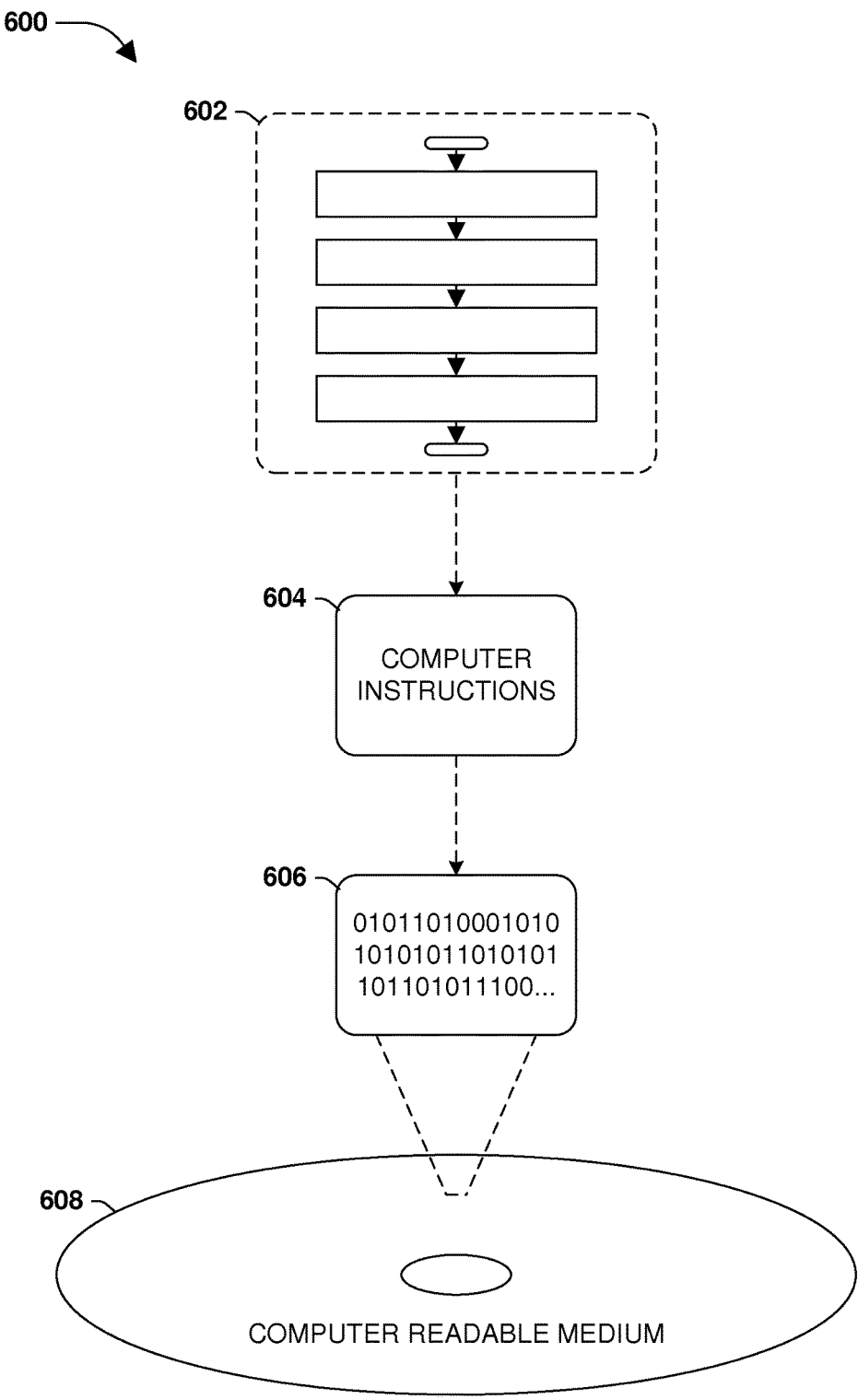
FIG. 6 is an illustration of an exemplary computer-readable medium wherein processor-executable instructions configured to embody one or more of the provisions set forth herein may be comprised.

FIG. 5 illustrates an example of a system 500, comprising a historian data repository 514 and/or a data analyzer component 516, for providing a recommendation 520 to address a design flaw of power system equipment 502. For example, the power system equipment 502 may comprise a component (H) 504 and a component (I) 508. The historian data repository 514 may be configured to acquire historical sensor data 510 and/or historical field test data 512 for the power system equipment 502 (e.g., temperature data, fault data, flow rate, moisture data, an alert of a measurement exceeding a warning threshold, field test observations, etc.).

The data analyzer component 516 may analyze the historical sensor data 510 and/or the historical field test data 512 utilizing one or more factors 518, such as a redesign cost, a maintenance replacement cost, a maintenance repair cost, a manufacturing alternative cost, a failure impact, etc. to identify a design flaw and/or provide the recommendation 520 for addressing the design flaw. For example, the data analyzer component 516 may determine that the component (H) 504 has a design flaw. The data analyzer component 516 may determine that a cost to redesign component (H) 504 exceeds a cost to use an alternative component (J), in place of the component (H) 504, during manufacturing of the power system equipment 502. Accordingly, the data analyzer component 516 may specify, that the alternative component (J) is a recommended replacement component for replacing the component (H) 504 during manufacturing of power system equipment, through the recommendation 520.

Figure 7:
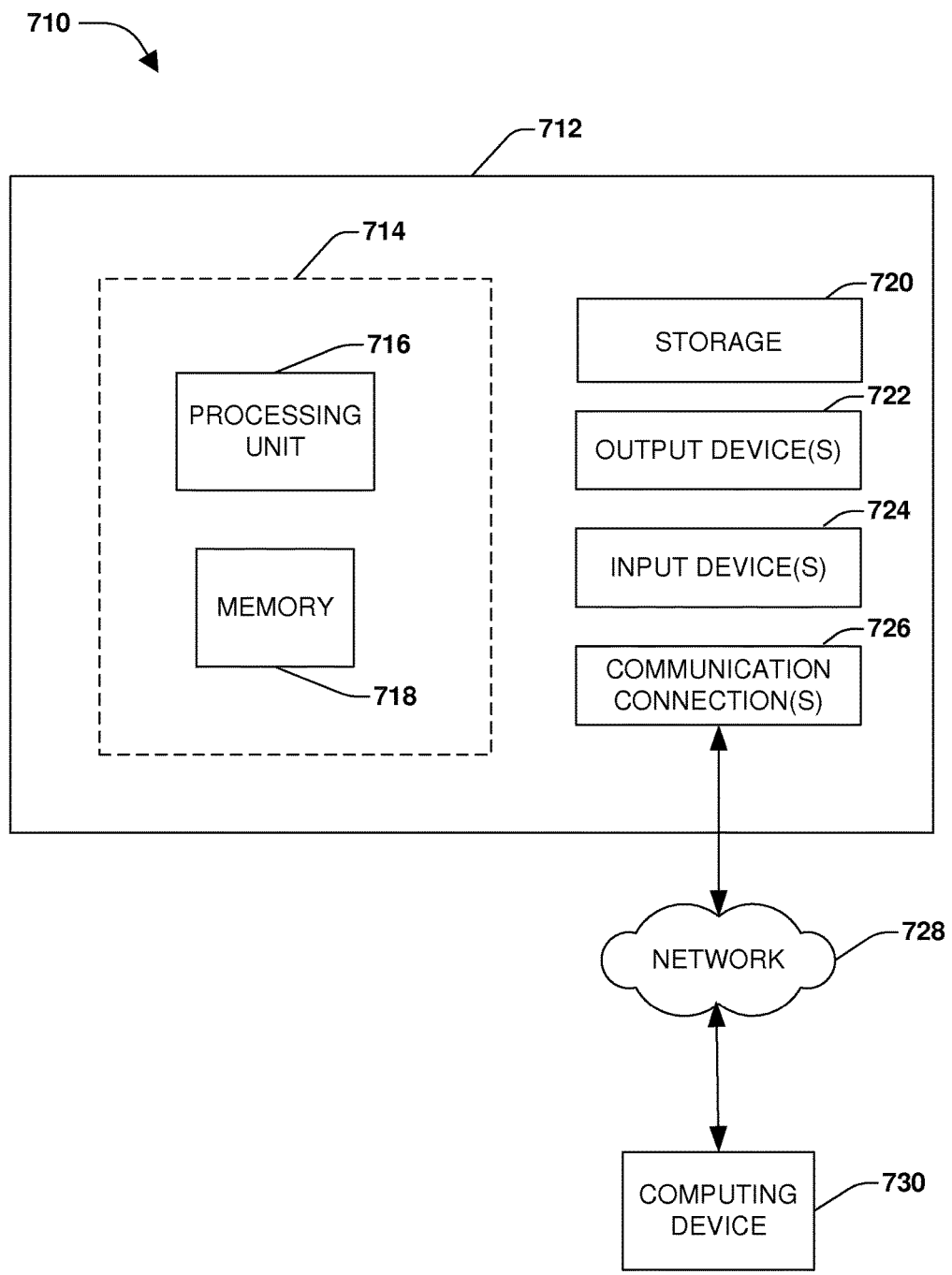
FIG. 7 illustrates an exemplary computing environment wherein one or more of the provisions set forth herein may be implemented.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 600, the processor-executable computer instructions 604 may be configured to perform a method 602 such as at least some of the exemplary method 100 of FIG. 1, for example. In another such embodiment, the processor-executable instructions 604 may be configured to implement a system, such as at least some of the exemplary system 200 of FIG. 2, at least some of the exemplary system 300 of FIG. 3, at least some of the exemplary system 400 of FIG. 4, and/or at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
   acquiring historical sensor data yielded from one or more sensors operably coupled to power system equipment, the historical sensor data indicative of one or more sensor measurements;
   acquiring historical field test data yielded from one or more field tests performed on the power system equipment, the historical field test data indicative of one or more field test measurements;
   analyzing the historical sensor data and the historical field test data to identify a design flaw of a component of the power system equipment;
   determining a redesign cost to redesign the component;
   determining a failure impact corresponding to an impact upon the power system equipment of the component failing from the design flaw; and
   performing one of (i) a redesign of the component in response to the failure impact exceeding the redesign cost, or (ii) a repair or replacement of at least part of the component in response to the redesign cost exceeding the failure impact.

2. The method of claim 1, the power system equipment corresponding to an equipment model type, and the method comprising:
   acquiring a set of historical sensor data for a set of power system equipment corresponding to the equipment model type;
   acquiring a set of historical field test data for the set of power system equipment; and
   analyzing the set of historical sensor data and the set of historical field test data to identify a model design flaw for the equipment model type.

3. The method of claim 2, comprising:
   recommending a manufacturing redesign to implement during manufacturing of power system equipment having the equipment model type.

4. The method of claim 2, comprising:
   recommending a maintenance strategy for the set of power system equipment to address the model design flaw.

5. The method of claim 4, the maintenance strategy comprising a component replacement strategy.

6. The method of claim 4, the maintenance strategy comprising a component repair strategy.

7. The method of claim 1, comprising providing a recommendation for addressing the design flaw.

8. The method of claim 7, the recommendation specifying a new component, having a different model type than the component, for replacing the component.

9. The method of claim 7, the recommendation specifying a recommended replacement component for replacing the component.

10. The method of claim 7, the providing a recommendation comprising:
    specifying, as the recommendation, a new manufacturing design for the power system equipment to implement during manufacture of the power system equipment.

11. The method of claim 7, the providing a recommendation comprising:
    evaluating the redesign cost, a maintenance replacement cost to replace the component during maintenance, a maintenance repair cost to repair the component during maintenance, a manufacturing alternative component cost to use a second component in place of the component during manufacturing of the power system equipment, and the failure impact to create the recommendation.

12. The method of claim 7, the analyzing the historical sensor data and the historical field test data comprising:
    evaluating the historical sensor data and the historical field test data to identify a health trend for the power system equipment; and
    generating the recommendation based upon the health trend.

13. The method of claim 12, the health trend corresponding to a predicted future failure and an urgency time metric for addressing the predicted future failure.

14. The method of claim 1, comprising:
    responsive to the redesign cost exceeding the failure impact, recommending a redesign of a second component of the power system equipment to compensate for degraded performance or a predicted future failure of the component due to the design flaw.

15. A system comprising:
    a historian data repository configured to:
      acquire historical sensor data yielded from one or more sensors operably coupled to power system equipment, the historical sensor data indicative of one or more sensor measurements; and
      acquire historical field test data yielded from one or more field tests performed on the power system equipment, the historical field test data indicative of one or more field test measurements; and
    a data analyzer component configured to:
      analyze the historical sensor data and the historical field test data to identify a design flaw of a component of the power system equipment;
      determine a redesign cost to redesign the component;
      determine a failure impact corresponding to a failure of the power system equipment due to the component failing from the design flaw; and
      perform one of (i) a redesign of the component in response to the failure impact exceeding the redesign cost, or (ii) a redesign of a second component of the power system equipment in response to the redesign cost exceeding the failure impact.

16. The system of claim 15, the data analyzer component configured to:
    analyze the historical sensor data and the historical field test data to identify a health trend of the power system equipment; and
    generate a recommendation based upon the health trend.

17. The system of claim 16, the health trend corresponding to a predicted future failure and an urgency time metric for addressing the predicted future failure.

18. The system of claim 17, the data analyzer component configured to:
    facilitate implementation of maintenance upon the power system equipment to address the predicted future failure.

* * * * *